US011164155B2

(12) United States Patent
Lee (10) Patent No.: US 11,164,155 B2
(45) Date of Patent: Nov. 2, 2021

(54) MANAGEMENT SYSTEM OF VETERINARY INFORMATION FOR PETS USING DEDICATED EMAIL

(71) Applicant: Dr. Tail Inc., Seoul (KR)

(72) Inventor: Dae Hwa Lee, Suwon-si (KR)

(73) Assignee: Dr. Tail Inc., Seoul (KR)

( * ) Notice: Subject to any disclaimer, the term of this patent is extended or adjusted under 35 U.S.C. 154(b) by 0 days.

(21) Appl. No.: 17/063,518

(22) Filed: Oct. 5, 2020

(65) Prior Publication Data

US 2021/0295268 A1 Sep. 23, 2021

(30) Foreign Application Priority Data

Mar. 17, 2020 (KR) ........................ 10-2020-0032653

(51) Int. Cl.
*G06F 15/16* (2006.01)
*G06Q 10/10* (2012.01)
*G06N 5/04* (2006.01)
*H04L 12/58* (2006.01)

(52) U.S. Cl.
CPC .......... *G06Q 10/107* (2013.01); *G06N 5/045* (2013.01); *H04L 51/08* (2013.01)

(58) Field of Classification Search
USPC ....................................................... 709/206
See application file for complete search history.

(56) References Cited

U.S. PATENT DOCUMENTS 6,287,254 B1 * 9/2001 Dodds .................... G16B 20/20
600/300
6,375,612 B1 * 4/2002 Guichon .............. A01K 29/005
600/300

(Continued)

*Primary Examiner* — Anthony Mejia
(74) *Attorney, Agent, or Firm* — Kaplan Breyer Schwarz, LLP (57) ABSTRACT

The present disclosure relates a management system of veterinary information for pets for automatically uploading, storing, and managing veterinary information for a pet using a dedicated email. The management system of veterinary information for pets of the present embodiment constitutes a network in cooperation with a plurality of veterinarian terminals and a plurality of owner terminals, includes: a dedicated email generating part configured to generate and transmit an owner-dedicated email of an owner in response to a request issued from each of the plurality of owner terminals; a veterinary information receiving part configured to receive the veterinary information transmitted from each of the plurality of veterinarian terminals; a veterinary information transmitting part configured to transmit the received veterinary information to a respective owner terminal of the plurality of owner terminals; a veterinary information registering part configured to encrypt the received veterinary information and register the encrypted veterinary information in a database server, and a veterinary information-sharing part configured to provide, in response to a view request issued from each of the plurality of veterinarian terminals or each of the plurality of owner terminals, the veterinary information registered in the database server to the respective veterinarian terminal or the respective owner terminal.

4 Claims, 3 Drawing Sheets

(56) References Cited

U.S. PATENT DOCUMENTS

| | | | | |
|---|---|---|---|---|
| 2003/0088519 A1* | 5/2003 | Woodson | A01K 11/006 | 705/64 |
| 2005/0032034 A1* | 2/2005 | Dodds | G16H 10/40 | 435/4 |
| 2007/0180033 A1* | 8/2007 | Singh | G06Q 10/107 | 709/206 |
| 2010/0070583 A1* | 3/2010 | Fried | G06Q 10/107 | 709/206 |
| 2013/0198175 A1* | 8/2013 | Thalheim | G06F 16/2471 | 707/723 |
| 2014/0285339 A1* | 9/2014 | Thalheim | G06F 16/28 | 340/539.13 |
| 2016/0063188 A1* | 3/2016 | Thornberry | H04L 63/08 | 705/3 |
| 2016/0316723 A1* | 11/2016 | Wall | A01K 11/008 | |
| 2017/0004190 A1* | 1/2017 | Mokbel | G06F 16/248 | |
| 2017/0061307 A1* | 3/2017 | Bates | H04L 41/064 | |
| 2017/0161450 A1* | 6/2017 | White | G16H 10/60 | |

* cited by examiner

MANAGEMENT SYSTEM OF VETERINARY INFORMATION FOR PETS USING DEDICATED EMAIL

CROSS-REFERENCE TO RELATED APPLICATION

This application claims priority to and the benefit of Korean Patent Application No. 10-2020-0032653 filed in the Korean Intellectual Property Office on Mar. 17, 2020, the entire contents of which are incorporated herein by reference.

BACKGROUND OF THE DISCLOSURE

(a) Field of the Disclosure

The present disclosure relates to a management system of veterinary information for pets that enables owners to store and manage veterinary information of their animals using dedicated emails.

(b) Description of the Related Art

A pet may be defined as an animal which lives with the human.

The Ministry of Agriculture, Food and Rural Affairs of the Republic of Korea reported that the rates of households with pets were increased from 17% in 2012 to 28.1% in 2017. It could be due to social factors, such as increased the number of old population and single household, changed the concept concerning the family member. The social factors have increased to the number of households with pets exponentially. As growing the household with the pets, the industry related to the pets, such as animal clinics, veterinary medical devices, various insurance for animals, and so forth, is also growing rapidly.

The registration system for pets over the country could efficiently control them by providing further information that could also be beneficial to the related-industry. The system could solve pet-based issues, such as the abuse, abandonment, or neglect of the animals. In addition, the veterinary information of the animal could be included in the system that allows a veterinarian effectively provide a better veterinary service. However, it looks hard to be established in the U.S.

Recently, most veterinary clinics in the U.S. use an electronic medical record (EMR) system and store veterinary clinical information in the computer. However, information is barely shared or transferred to other clinics that may increase the cost of the veterinary service for the owner and reduce the clinical efficiency. For example, if owners adopted an animal from the shelter or moved to out of town with their pets, the veterinary information should be shared or transferred to the new clinic. However, if it has not been done, the owner should pay for further examination or additional vaccination (i.e., rabbits vaccination) in the new clinic and waste time for this matter.

In addition, in the case in which companion-animal veterinary information created in an animal clinic is stored and managed in a server or the like, the animal clinic needs to make a database of the veterinary information in the form of PDF or the like and directly uploads the same to the server. When there is a request to view the veterinary information by a new owner or other animal clinics, the respective animal clinic needs to download the PDF file of the veterinary information to provide the veterinary information. This causes should inconvenience.

SUMMARY

Problem to be Solved

The present disclosure is proposed to solve the aforementioned problems, and the object of the present disclosure is to provide a management system of veterinary information for pets, which is more easily capable of storing, managing, and utilizing the information.

In addition, the present disclosure provides a management system of veterinary information for pets that enables owners to store and manage veterinary information for pets directly.

In addition, the present disclosure provides a management system of veterinary information for pets that is capable of further enhancing the security and integrity of veterinary clinical information for the pets to be stored and managed on a network.

Solution to Problem

According to an embodiment for achieving the aforementioned object, there is provided a management system of veterinary information for pets that constitutes a network in cooperation with a plurality of veterinarian terminals and a plurality of owner terminals, includes: a dedicated email generating part configured to generate and transmit an owner-dedicated email of an owner in response to a request issued from each of the plurality of owner terminals; a veterinary information receiving part configured to receive veterinary information transmitted from each of the plurality of veterinarian terminals; a veterinary information transmitting part configured to transmit the received veterinary information to a respective owner terminal of the plurality of owner terminals; a veterinary information registering part configured to encrypt the received veterinary information and register the encrypted veterinary information in a database server; and a veterinary information sharing part configured to provide, in response to a view request issued from each of the plurality of veterinarian terminals or each of the plurality of owner terminals, the veterinary information registered in the database server to the respective veterinarian terminal or the respective owner terminal.

In the management system of veterinary information for pets of the present embodiment, the dedicated email generating part may be configured to generate and transmit, in addition to the owner-dedicated email, a dedicated password corresponding to the owner-dedicated email.

In addition, in the management system of veterinary information for pets of the present embodiment, the veterinary information transmitting part may be configured to further transmit, to the owner terminal, registration permission information for confirming whether the transmitted veterinary information needs to be registered or not, and the veterinary information registering part may be configured to register the transmitted veterinary information in accordance with registration permission issued from the owner terminal.

In addition, the management system of veterinary information for pets of the present embodiment may further include: a veterinary information processing part configured to process the received veterinary information in a form that can be easily checked by the owner, and the explanation information extracting part configured to extract explanation information for explaining the received veterinary information from an explanation database, wherein the veterinary information transmitting part may be configured to transmit the processed veterinary information including the explanation information to the respective owner terminal of the plurality of owner terminals.

Furthermore, the management system of veterinary information for pets of the present embodiment may further include: a statistical information calculating part configured to calculate statistical information about a treatment item of the received veterinary information, wherein the veterinary information transmitting part may be configured to transmit the veterinary information further including the statistical information to the respective owner terminal of the plurality of owner terminals.

Furthermore, in the management system of veterinary information for pets of the present embodiment, the owner-dedicated email may include a virtual email provided to be linked to an actual Email of the owner.

Effects of the Present Disclosure

According to the present disclosure in some embodiments, it is possible to store and manage companion-animal veterinary information using an owner-dedicated email, thus more easily storing, managing, and utilizing the veterinary information in a safe manner.

In addition, according to the present disclosure in some embodiments, it is possible for other animal clinics or other institutions to utilize veterinary information, thus lowering the cost and reducing the time required to care a pet and improving the accuracy of medical treatment.

DETAILED DESCRIPTION

Specific structural or functional descriptions of embodiments according to the inventive concepts disclosed herein are merely illustrated for the purpose of describing embodiments according to the concepts of the present disclosure. The embodiments, according to the concepts of the present disclosure may be practiced in various forms and are not limited to embodiments described herein.

In addition, embodiments according to the concepts of the present disclosure may be embodied with various modifications and may have various forms. Thus, the embodiments will be described in detail with reference to the accompanying drawings. However, the embodiments according to the concepts of the present disclosure are not intended to limit specific embodiments and may include all modifications, equivalents, or alternatives falling within the spirit and scope of the present disclosure.

Preferable embodiments of the present disclosure will now be described in detail with reference to the accompanying drawings.

Figure 1:
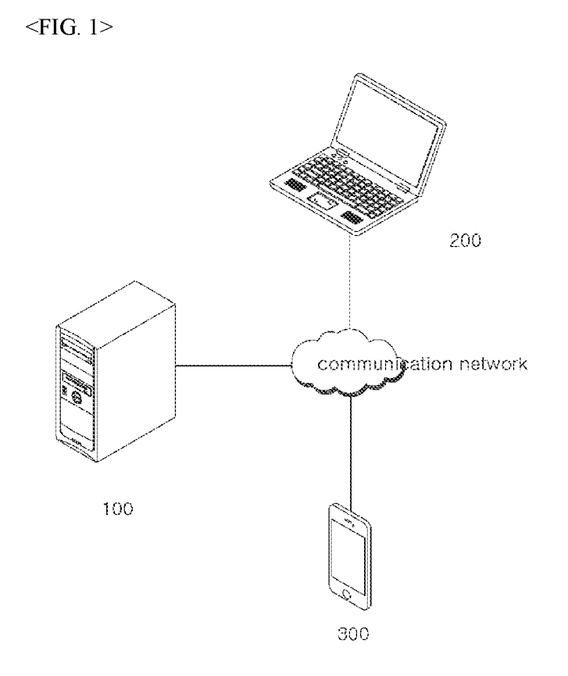
FIG. 1 is a view showing an exemplary configuration in the vicinity of a management system of veterinary information for pets according to an embodiment of the present disclosure.
Figure 2:
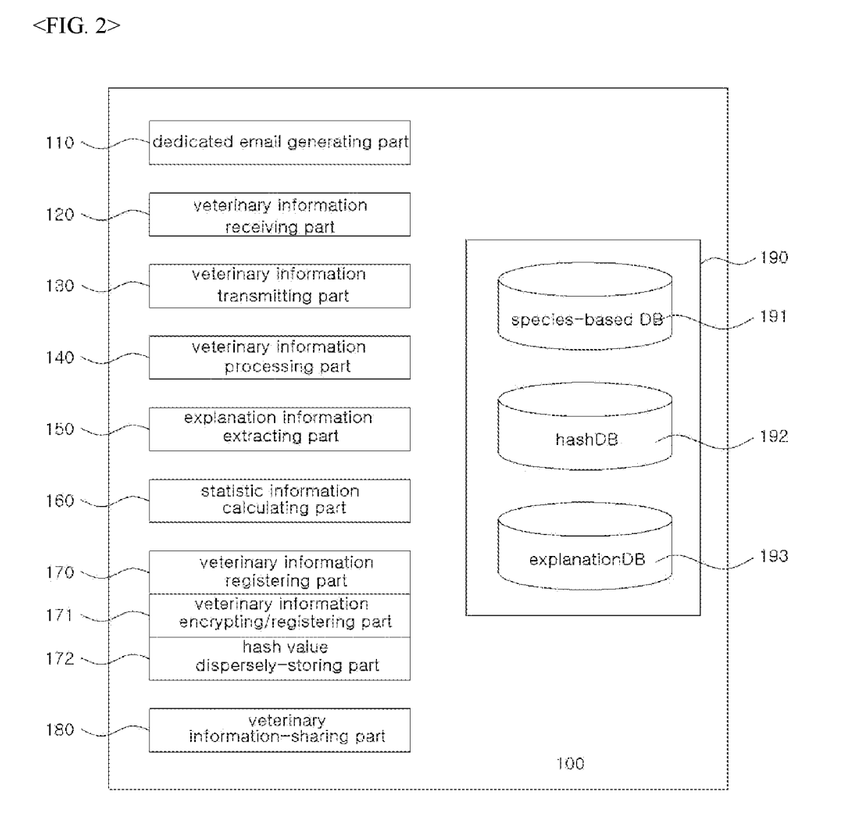
FIG. 2 is a view showing an exemplary configuration of the management system of veterinary information for pets according to an embodiment of the present disclosure.

FIG. 1 is a view showing an exemplary configuration in the vicinity of a management system of veterinary information for pets according to an embodiment of the present disclosure, and FIG. 2 is a view showing an exemplary configuration of the management system of veterinary information for pets according to an embodiment of the present disclosure. A management system of veterinary information for pets generates a personal email for each owner and stores them on the owner's storage when they receive veterinary information through a personal email that owner can access through the application.

First, referring to FIG. 1, a management system of veterinary information for pets 100 of the present embodiment may be connected to a plurality of veterinarian terminals 200 distributed in all over the country or distributed in administrative districts, and a plurality of owner terminals 300 of owners who raise pets, through a communication network. The combination of the management system of veterinary information for pets 100, the veterinarian terminals 200, and the owner terminals 300 constitutes a network connected to each other by a wired or wireless communication network.

The veterinarian terminal 200 may include various terminals, such as a personal computer (PC), a notebook, a tablet computer which is provided in an animal clinic, or a smartphone of a veterinarian, and the owner terminal 300 may include a portable terminal, such as a smartphone of the owner. The management system of veterinary information for pets 100 according to the present embodiment may be implemented by a collective entity (in the form of an application program) of code data installed and executed in the memory of one computer system or a server computer system. Such an application program may be stored and executed in the veterinarian terminal 200 and the owner terminal 300 in the form of application.

Basically, the management system of veterinary information for pets 100 configured as above delivers companion-animal veterinary information, which is transmitted from the veterinarian terminal 200 located in each animal clinic to the owner terminal 300. In order to enable the owner to store and manage the veterinary information, the management system of veterinary information for pets 100 generates an owner-dedicated email and sends the veterinary information to the respective owner through the owner-dedicated email. Thus, the owner can confirm the veterinary information and store and manage the veterinary information.

In addition, the management system of veterinary information for pets 100 according to the present embodiment may process the veterinary information transmitted from the veterinarian terminal 200 in the form of information that can be easily checked and understood by the owner and may provide the processed information to the owner terminal 300.

In addition, the management system of veterinary information for pets 100 according to the present embodiment may perform a statistical process on accumulated materials for each item of the veterinary information and provide the same to the owner terminal 300.

In addition, the management system of veterinary information for pets 100 according to the present embodiment may also serve to provide the veterinary information to a veterinarian terminal 200 of another veterinarian who wants to view the respective veterinary information.

To do this, as illustrated in FIG. 2, the management system of veterinary information for pets 100 may include:

a dedicated email generating part 110 configured to generate an owner-dedicated email; a veterinary information receiving part 120 configured to receive the companion-animal veterinary information inputted to the veterinarian terminal 200; a veterinary information transmitting part 130 configured to transmit the veterinary information to the owner terminal 300; a veterinary information processing part 140 configured to process the veterinary information to be provided to the owner; an explanation information extracting part 150 configured to extract an explanation information about the veterinary information to be transmitted to the owner terminal 300; a statistical information calculating part 160 configured to calculate statistical information about the veterinary information to be transmitted to the owner terminal 300; a veterinary information registering part 170 configured to encrypt and store the companion-animal veterinary information; a veterinary information sharing part 180 configured to provide the veterinary information to the owner terminal 300 or the veterinarian terminal 200 so as to be shared with the owner terminal 300 or the veterinarian terminal 200; and a database (DB) server 190 in which various kinds of DBs are stored.

Specifically, the dedicated email generating part 110 is configured to automatically generate the owner-dedicated email in response to an owner's request. The owner-dedicated email may be created in the dedicated email generating part 110 when an application for using the management system of veterinary information for pets 100 is installed in the owner terminal 300. A plurality of owner-dedicated Emails may be assigned to different accounts of a plurality of different owners and may be utilized as identification information for identifying the respective owners.

The plurality of owner-dedicated emails created in the dedicated email generating part 110 may preferably have the same domains. As one example, the dedicated email generating part 110 may use the same domain (drtail.us), such as ani001@drtail.us, ani002@ drtail.us, anio03@drtail.us, or the like, and the plurality of owners may be classified into different identifications (IDs), such as ani001, ani002, ani003 and the like.

Further, the dedicated email generating part 110 may generate a dedicated password to be combined in a corresponding relationship with the owner-dedicated email. The dedicated password may be set by each owner or may be set in the dedicated email generating part 110 to provide each owner. The set dedicated password may be used to decode the encrypted veterinary information when the owner checks the companion-animal veterinary information transmitted through the owner-dedicated email, or when the owner requests to view the companion-animal veterinary information stored in the DB server 190.

Further, the owner-dedicated email generated in the dedicated email generating part 110 may be configured as a virtual email. The virtual email may be configured to be linked to the actual email that is being used by the owner. The actual email of the owner may be collected by a request of the dedicated email generating part 110 when the application is installed. In a case of transmitting information through the virtual owner-dedicated email, the information is delivered through the actual email of the owner so that the owner can confirm the information through the actual email.

Thus, the dedicated email generating part 110 is convenient for a system administrator in that there is no need to manage emails of owners represented by a great number of different mail domains, and is also convenient for each owner in that an email can be generated without individually signing up and registering an account.

The veterinary information receiving part 120 is configured to receive the veterinary information inputted to the veterinarian terminal 200 when the pet is subjected to medical treatment in the clinic, when the owner visits the clinic together with the pet thereof, the veterinarian inputs, to the veterinarian terminal 200, basic information including information of the owner and information of the pet accompanied by the owner prior to the medical treatment.

In this case, the basic information inputted to the veterinarian terminal 200 may include owner identification information, such as the name, address, contact details, dedicated email, and the like of the owner, and information on a species of the pet (dog, cat, hamster, rabbit, or the like).

The veterinary information receiving part 120 may generate a species-based serial number according to the species of the pet inputted to the veterinarian terminal 200. As an example, the species-based serial number may include codes such as D01, D02, D03, and the like for dogs and codes such as C01, C02, C03, and the like for cats.

In addition, after treating the pet, the veterinarian may further input, to the veterinarian terminal 200, biological information of the pet (body information such as breed, age, weight, height, blood pressure, muzzle pattern, vein pattern, integument pattern, and the like) and treatment detail information such as disease information of the pet (information about symptoms, disease name, prescription, and the like) and the like. The veterinarian terminal 200 transmits the additional information to the management system of veterinary information for pets 100.

The veterinary information receiving part 120 receives the veterinary information including the owner identification information, the species information of the pet (the species-based serial number), the biological information of the pet, and the disease information of the pet, which are transmitted from the veterinarian terminal 200, and makes a database of the received veterinary information.

The veterinary information transmitting part 130 is configured to transmit the veterinary information received from the veterinarian terminal 200 to the owner terminal 300.

When receiving the veterinary information from the veterinarian terminal 200, the veterinary information transmitting part 130 transmits the received veterinary information to the owner terminal 300. At this time, the veterinary information transmitting part 140 transmits the veterinary information to the owner through the owner-dedicated email that is generated in the dedicated email generating part 110. Using the owner terminal 300, the owner can confirm the veterinary information received through the owner-dedicated email or the actual email in conjunction with the owner-dedicated email.

Further, the veterinary information transmitting part 130 may also provide, together with the veterinary information, registration permission information for confirming whether the owner permits the registration of the veterinary information or not. The registration permission information may be provided in the form of an icon or the like. The owner checks the veterinary information. When the owner wants to register the veterinary information in the DB server 190 of the management system of veterinary information for pets 100, the owner clicks the registration permission icon to request the registration of the veterinary information. Then, the owner terminal 300 sends the registration request information to the management system of veterinary information for pets 100.

The veterinary information processing part 140 is configured to process the companion-animal veterinary information to be transmitted to the owner terminal 300 such that the owner can easily confirm the veterinary information. In general, the veterinary information is recorded and provided in a chart form and includes a large number of insignificant portions that are pointless to the owner. Actual important information is just a few of the veterinary information. For this reason, in order to confirm such important veterinary information through the smartphone having a small screen, the owner needs to directly scroll and find out the respective portion of the actual important information. This may cause inconvenience to the owner.

The veterinary information processing part 140 deletes the insignificant portions in the chart of the veterinary information to separately extract the actual important veterinary information, which is to be necessarily confirmed by the owner, and processes (edits) the extracted information in a form that can be easily checked by the owner when being displayed on the screen of the smartphone, namely the owner terminal 300. An example of the method of processing the veterinary information may include deleting a blank portion and enlarging a character portion.

The explanation information extracting part 150 is configured to extract explanation information about terminologies of the veterinary information from an explanation DB 193. Most of the veterinary information recorded by the veterinarian is hard to be understood by the owner, who is a layman in the medical treatment field. The explanation information extracting part 150 extracts the explanation information that is described by language for allowing the layman to easily read on professional medical treatment terminologies.

The statistical information calculating part 160 is configured to extract a change of previous veterinary information with respect to current veterinary information in a specific item. That is, when the veterinary information related to one or more treatment items is transmitted from the veterinarian terminal 200, the statistical information calculating part 160 extracts the previous veterinary information which is matched with the respective treatment item from a species-based DB 191, compares the extracted previous veterinary information with the received veterinary information, and converts trend corresponding to the comparison result into graph information or the like. As an example, when receiving the veterinary information about the blood component examination result of the pet, the statistical information calculating part 160 extracts previous blood component examination information of the previous treatment result from the species-based DB 191, compares the previous blood component information with the received current blood component information and converts the component comparison results into a graph, a comparison table, or the like.

On the other hand, the veterinary information transmitting part 130 transmits information obtained by processing, in the veterinary information processing part 140, the veterinary information received from the veterinarian terminal 200 in the form easy to be understood by the owner, the explanation information described in the easy-to-understand terminology in the explanation information extracting part 150, and the statistical information calculated in the statistical information calculating part 160, to the owner terminal 300. This makes it possible for the owner to confirm and understand the veterinary information easily.

The veterinary information registering part 170 is configured to store and register the companion-animal veterinary information transmitted to the owner terminal 300 in the DB server 190 of the management system of veterinary information for pets 100. The veterinary information registering part 170 may store the veterinary information in the DB server 190 at the time of receiving the veterinary information transmitted from the veterinarian terminal 200 and may register the veterinary information in the DB server 190, according to the request of the owner. That is, when the veterinary information is transmitted to the owner terminal 300, the owner may confirm the veterinary information via the owner terminal 300 and then request the registration of the veterinary information. The veterinary information registering part 170 registers the veterinary information when receiving the registration request from the owner terminal 300. Thus, the registration and storage of the companion-animal veterinary information can be performed in accordance with the intention of the owner.

When the veterinary information is initially registered in the DB server 190, in addition to the detailed veterinary information of the pet, the owner identification information and the species-based serial number of the pet are registered in the DB server 190. During subsequent registration, only detailed veterinary information as new information may be additionally stored and registered in the DB server 190 in which the respective owner identification information and the species-based serial number of the respective pet have been stored. The veterinary information registering part 130 may encrypt the companion-animal veterinary information with the dedicated password of the owner and may register the same in the DB server 190.

To do the foregoing, the veterinary information registering part 170 may include veterinary information encrypting/registering part 171 configured to perform a hashing process and an encrypting process on the veterinary information received from the veterinarian terminal 200 in order to enhance the security and integrity of the veterinary information and register the same in the species-based DB 191, and a hash value dispersedly-storing part 172 configured to match a hash value generated by performing the hashing process on the veterinary information in the veterinary information encrypting/registering part 171 with at least one of the owner identification information and the species-based serial number of the pet and dispersedly store the same in a hash DB 192.

The veterinary information sharing part 180 is configured to, when receiving a veterinary information view request from the owner terminal 300 or the veterinarian terminal 200, provide the respective veterinary information to the owner terminal 300 or the veterinarian terminal 200, which requests to view the respective veterinary information, so as to share the respective veterinary information with each other. The owner may directly request to view the veterinary information through the owner terminal 300 thereof, and the veterinarian may also directly request to view the veterinary information through the veterinarian terminal 200 thereof. In the case in which the view request is issued from the veterinarian terminal 200, the permission of the respective owner is required. The permission of the respective owner may be performed by entering, for example, the dedicated password of the respective owner.

In an embodiment, the veterinarian terminal 200 may be a veterinarian terminal 200 included in an animal clinic in which veterinary treatment is initially performed or a veterinarian terminal 200 of another animal clinic. The owner may visit the same animal but may visit another animal clinic other than the initially-visited animal clinic due to the house movement or the like. Thus, the veterinary information obtained in the initially-visited animal clinic may be shared with the veterinarian terminal 200 of another animal clinic to which the owner has visited, thereby enabling the continuous medical treatment.

Further, when there is the veterinary information view request, the veterinary information sharing part 180 extracts a hash value that is to be matched with at least one of the owner identification information and the species-based serial number of the pet, which are included in the view request, finds out the encrypted veterinary information corresponding to the extracted hash value, decodes the encrypted veterinary information, and then provides the same to the owner terminal 300 or the veterinarian terminal 200. In this case, the decoding of the veterinary information may be performed using the owner-dedicated password or a temporary password as a disposable password provided to the owner. The temporary password is advantageous for the privacy protection of the owner and the pet because the temporary password can be used to view the veterinary information once.

Although in the present embodiment, there has been described the configuration in which the veterinary information sharing part 180 provides the veterinary information to the owner terminal 300 or the veterinarian terminal 200, the veterinary information sharing part 180 may provide the veterinary information to other various institutions that require the veterinary information, such as a consulting, a research institution and the like, according to a request of the owner terminal 300.

The DB server 190 stores and manages the owner's information and pet's information. To do this, the DB server 190 includes the species-based DB 191 that stores the companion-animal veterinary information, the hash DB 192 that stores data obtained by matching hash value, which is generated by performing the hashing process on the veterinary information, with at least one of the owner identification information and the species-based serial number of the pet, and the explanation DB 193 that stores information described by terms for allowing the generic publics to understand professional medical terminologies of the veterinary information easily. Further, the DB server 190 may further include a consulting DB (not shown) that stores consulting information such as functional feed, physical activity, vaccination, surgery time, mating time, health-care time, rehabilitation mechanism, fashion accessory, toy, life-pattern advice and the like, according to the veterinary information of the pet.

Figure 3:
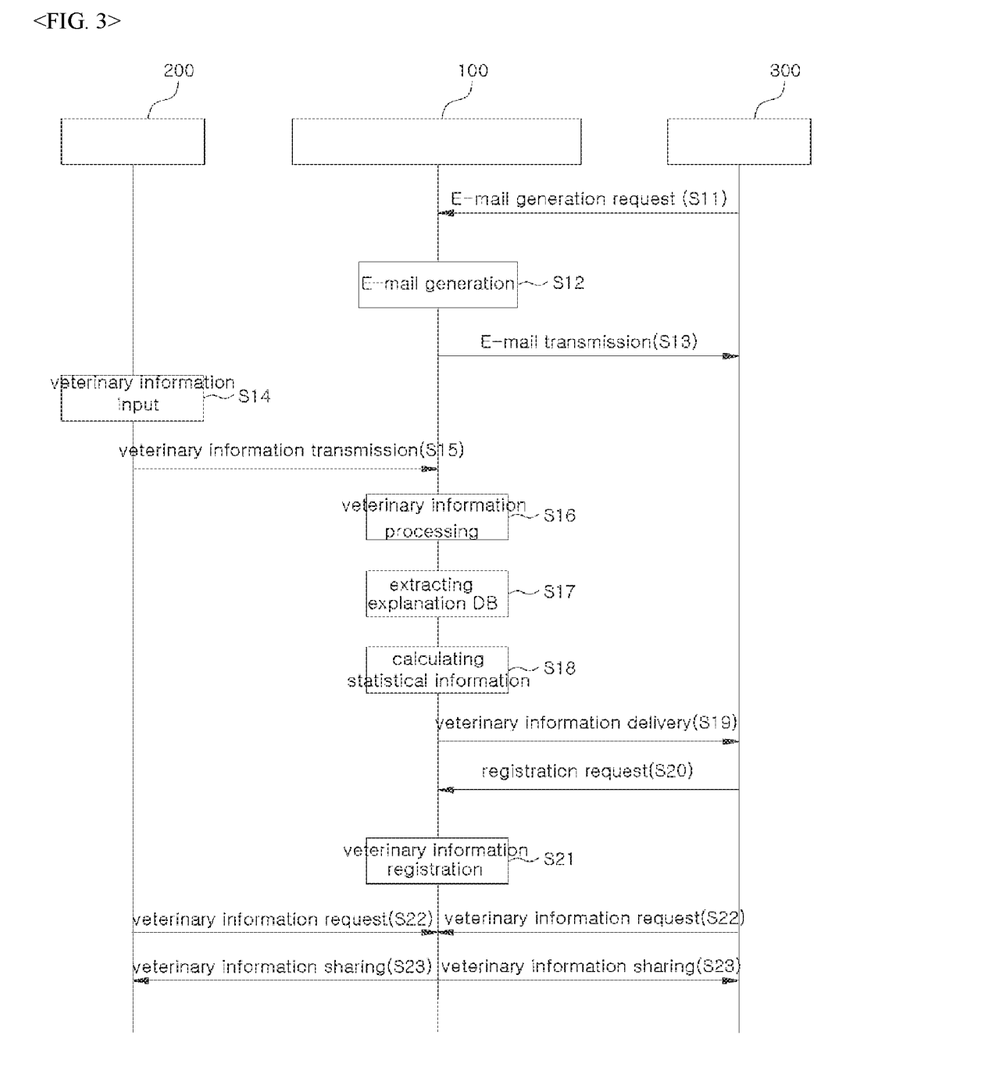
FIG. 3 is a control flowchart illustrating a process of storing and providing a companion-animal veterinary information according to an embodiment of the present disclosure.

FIG. 3 is a control flowchart illustrating a process of storing and providing the companion-animal veterinary information according to an embodiment of the present disclosure.

Referring to FIG. 3, an owner who raises a pet installs an application to use a management system of veterinary information for pets through the owner terminal 300 thereof and requires the generation of an owner-dedicated email (S11). The dedicated email generating part 110 generates the owner-dedicated email and provides the same to the owner terminal 300 (S13) automatically.

Subsequently, after the owner visits the animal clinic and the pet of the owner receives the medical treatment, and the veterinarian inputs the veterinary information of the pet to the veterinarian terminal 200 (S14). The inputted veterinary information is transmitted to the management system of veterinary information for pets 100 (S15). The veterinary information transmitting part 130 sends the respective veterinary information to the owner terminal 300 using the owner-dedicated email (S19).

At this time, the veterinary information processing part 140 processes the major portion of the veterinary information in advance to be easily confirmed by the owner (S16). The explanation information extracting part 150 extracts the explanation information, which is described by terms for allowing the layman to easily understand professional medical terminologies, from the explanation DB 193 (S17). In addition, the statistical information calculating part 160 calculates the statistical information about the trend of the treatment item (S18). Thus, the veterinary information transmitting part 130 transmits the processed veterinary information, including the explanation information and the statistical information to the owner terminal 300 (S19).

The owner confirms the veterinary information through the owner terminal 300, and then may store the veterinary information in the owner terminal 300, or may request to store and register the veterinary information in the DB server 190 (S20).

Subsequently, the veterinary information for registering part 170 stores and manages the veterinary information in the DB server 190 in accordance with the veterinary information registration request received from the owner terminal 300 (S21). At this time, the veterinary information is registered in an encrypted state.

In addition, when the veterinary information view request is issued from the owner terminal 300 or the veterinarian terminal 200 (S22), the veterinary information sharing part 180 provides the veterinary information to the owner terminal 300 or the veterinarian terminal 200 which wants to view the veterinary information so as to share the veterinary information with each other (S23). At this time, the sharing of veterinary information may be decoded with an owner-dedicated password or a disposable temporary password.

While exemplary embodiments of the present disclosure have been illustrated and described as described above, various modifications and other embodiments may be made by those skilled in the art. Such modifications and other embodiments are all contemplated and included in the appended claims without departing from the spirit and scope of the present disclosure.

EXPLANATION OF REFERENCE NUMERALS

100: management system of veterinary information for pets
200: veterinarian terminal
300: owner terminal
110: dedicated email generating part
120: veterinary information receiving part
130: veterinary information transmitting part
140: veterinary information processing part
150: explanation information extracting part
160: statistic information calculating part
170: veterinary information registering part
171: veterinary information encrypting/registering part
172: hash value dispersely-storing part
180: veterinary information sharing part
190: DB server
191: species-based DB
192: hash DB
193: explanation DB

What is claimed is:
1. A management system of veterinary information for pets that constitutes a network in cooperation with a plurality of veterinarian terminals and a plurality of owner terminals, comprising:

a dedicated email generating part configured to generate and transmit an owner-dedicated email of an owner in response to a request issued from each of the plurality of owner terminals;

a veterinary information receiving part configured to receive a veterinary information transmitted from each of the plurality of veterinarian terminals;

a veterinary information transmitting part configured to transmit the received veterinary information to a respective owner terminal of the plurality of owner terminals;

a veterinary information registering part configured to encrypt the received veterinary information and register the encrypted veterinary information in a database server;

a veterinary information sharing part configured to provide, in response to a view request issued from each of the plurality of veterinarian terminals or each of the plurality of owner terminals, the veterinary information registered in the database server to the respective veterinarian terminal or the respective owner terminal;

a veterinary information processing part configured to process the received veterinary information in a form that is easily checked by the owner;

an explanation information extracting part configured to extract explanation information for explaining the received veterinary information from an explanation database;

a statistical information calculating part configured to calculate a statistical information about a treatment item of the received veterinary information, wherein the statistical information calculating part extracts a previous received veterinary information with the received veterinary information;

wherein the veterinary information transmitting part is configured to transmit the veterinary information further including the statistical information to the respective owner terminal of the plurality of owner terminals; and wherein the veterinary information transmitting part is configured to transmit the processed veterinary information, including the explanation information to the respective owner terminal of the plurality of owner terminals.

2. The system according to claim 1, wherein the dedicated email generating part is configured to generate and transmit, in addition to the owner-dedicated email, a dedicated password corresponding to the owner-dedicated email.

3. The system according to claim 2, wherein the veterinary information transmitting part is configured to further transmit a registration permission information for confirming whether the transmitted veterinary information needs to be registered or not, and the veterinary information registering part is configured to register the transmitted veterinary information in accordance with registration permission issued from the owner terminal.

4. The system, according to claim 1, wherein the owner-dedicated email includes a virtual email provided to be linked to an actual email of the owner.

* * * * *